United States Patent [19]
Holmes

[11] 3,870,712
[45] Mar. 11, 1975

[54] CINCHONINIC ACID DERIVATIVES

[75] Inventor: Richard E. Holmes, Indianapolis, Ind.

[73] Assignee: Eli Lilly and Company, Indianapolis, Ind.

[22] Filed: Nov. 8, 1973

[21] Appl. No.: 414,005

Related U.S. Application Data

[62] Division of Ser. No. 235,850, March 17, 1972, Pat. No. 3,799,929.

[52] U.S. Cl. ...... 260/240 A, 260/240 E, 260/240 J, 260/287 R, 424/258, 424/262
[51] Int. Cl. ............................................ C07d 33/14
[58] Field of Search ......... 260/240 A, 240 J, 240 E, 260/287 R, 295 B

[56] References Cited
UNITED STATES PATENTS

| | | | |
|---|---|---|---|
| 1,350,408 | 8/1920 | Hartmann et al. | 260/287 R |
| 1,846,321 | 2/1932 | Dohrn et al. | 260/287 R |
| 2,579,420 | 12/1951 | Coles | 260/287 R |
| 3,374,239 | 3/1968 | Burch | 260/287 R |

OTHER PUBLICATIONS

Burch, J. Med. Chem., 12(1969), pp. 535–536.

Ardashey et al., Chem. Abst., 69(1968), 106504.

Mangini, Chem. Abst. 32(1938), Col. 3900–3901.

*Primary Examiner*—Arthur P. Demers
*Attorney, Agent, or Firm*—Nancy J. Harrison; Kathleen R. S. Page

[57] ABSTRACT

A group of novel 8-chloro-2-heteroarylcinchoninic acids and derivatives which are useful as antibacterial agents.

4 Claims, No Drawings

CINCHONINIC ACID DERIVATIVES

This is a division of application Ser. No. 235,850, filed Mar. 17, 1972, now U.S. Pat. No. 3,799,929.

SUMMARY OF THE INVENTION

The present invention is directed to compounds of the following formula:

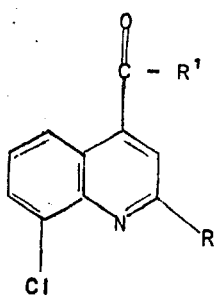

I wherein R represents:
- a. 2-indolyl,
- b. 1-methyl-2-indolyl,
- c. 3-indolyl,
- d. 1-methyl-3-indolyl,
- e. 2-phenoxathiinyl,
- f. 2-pyridyl,
- g. 2-furyl,
- h. (2-furyl)vinyl,
- i. (5-nitro-2-furyl)vinyl,
- j. 2-thienyl, or
- k. 5-nitro-2-thienyl; and $R^1$ represents:
- a. OH or
- b. loweralkoxy of 1 to 3 carbon atoms, or, additionally, when R is 2-pyridyl,
- c. hydrazino,
- d. β-monoloweralkylhydrazino of 1 to 3 carbon atoms,
- e. β-monoloweralkylidenehydrazino of 1 to 3 carbon atoms,
- f. β,β-diloweralkylhydrazino of 2 to 6 carbon atoms, or
- g. hydroxylamino, and the pharmaceutically-acceptable, alkali-metal and alkaline-earth-metal salts derived from those compounds of Formula I wherein R' is OH.

The compounds defined above are useful as antibacterial agents, being especially useful in the treatment of infections of streptococcal origin.

DETAILED DESCRIPTION OF THE INVENTION

The scope of compounds in accordance with the present invention is as defined hereinabove. In those moieties defined herein as loweralkyl, loweralkylidene and loweralkoxy, the alkyl portion can be straight or branched chain. Where $R^1$ represents β,β-diloweralkylhydrazino, the alkyl groups can be alike or different.

In the case of salts, the alkali metal or alkaline-eart metal may be chosen to exhibit special advantages, such as ready solubility, ease of crystallization and the like, but in any event must be pharmaceutically acceptable. Representative and suitable salts include the sodium, potassium, magnesium, and calcium salts.

In general, the compounds of Formula I are prepared via a Pfitzinger reaction (H. Krauch and W. Kunz, "Organic Name Reactions," John Wiley, New York, N.Y., 1964, p. 349; Robert C. Elderfield in "Heterocyclic Compounds," Vol. 4, Robert C. Elderfield, Ed., John Wiley, New York, N.Y., 1952, pp. 47–56). In accordance with the Pfitzinger reaction, 7-chloroisatin is reacted with an appropriate alkali to release 3-chloroisatinic acid, which in the presence of a compound of the formula acetyl-R forms a 2-R-8-chlorocinchoninic acid salt.

In carrying out the Pfitzinger reaction, 7-chloroisatin is initially mixed with the selected alkali, and the mixture is heated, such as to a temperature of 80°–90°C., to prepare the intermediate 3-chloroisatinic acid in the reaction mixture. The desired acetyl-R compound is then added to the reaction mixture which is again heated, such as to reflux temperatures. These procedures yield the desired 2-R-8-chlorocinchoninic acid salt. Typically, in the Pfitzinger reaction, this salt product is separated and dissolved in water; glacial acetic acid is added to adjust the pH of the solution to the range of about pH 2 to pH 4, thereby converting the salt to the desired 2-R-8-chlorocinchoninic acid. The acid is readily separated by filtration and purified by standard procedures. The Pfitzinger reaction, therefore, provides either the desired cinchoninic acids (compounds of Formula I wherein $R^1$ is OH) or the salts thereof. By selection of the alkali, the desired salt can be obtained directly; those salts not conveniently prepared in this manner are readily prepared by completing the Pfitzinger reaction to obtain the corresponding cinchoninic acid and converting the acid by conventional methods to the selected salt thereof.

The Pfitzinger reaction is not suited for the preparation of the compounds of Formula I wherein R represents 5-nitro-2-thienyl, (2-furyl)vinyl, or (5-nitro-2-furyl)vinyl.

Those compounds of Formula I wherein R represents 5-nitro-2-thienyl are prepared by nitrating 8-chloro-2-(2-thienyl)-cinchoninic acid, prepared as described hereinabove. The nitration is conveniently conducted with concentrated nitric acid in concentrated sulfuric acid at temperatures of from about 0° to 10°C.

To prepare the compounds of Formula I wherein R represents (2-furyl)vinyl or (5-nitro-2-furyl)vinyl, furfural diacetate or 5-nitrofurfural diacetate is reacted with 8-chloro-2-methylcinchoninic acid. Conveniently, the reaction is carried out in the presence of an acid such as acetic acid, and the resulting solution is heated at reflux temperatures for a period of time. The 8-chloro-2-[(2-furyl)vinyl]cinchoninic acid or 8-chloro-2-[(5-nitro-2-furyl)vinyl]cinchoninic acid thus obtained is separated and purified by well-known methods. The starting material used in these reactions, 8-chloro-2-methylcinchoninic acid, is obtained by the Pfitzinger method, i.e., by reaction of 7-chloroisatin with an excess of acetone in an alkaline medium, followed by the usual workup, as described hereinabove.

8-Chloro-2-(5-nitro-2-thienyl)cinchoninic acid, 8-chloro-2-[(2-furyl)vinyl]cinchoninic acid or 8-chloro-2-[(5-nitro-2-furyl)]cinchoninic acid can be reacted further to obtain the corresponding, specified alkali-metal and alkaline-earth-metal salts. In such further reaction the above-mentioned acid is reacted with a stoichiometric amount of a suitable base to obtain the corresponding salt. These reactions are of a type well known in the art, and the particular steps employed to prepare such salts are carried out in accordance with these well-known procedures.

The compounds of Formula I wherein $R^1$ represents loweralkoxy are prepared from the compounds of Formula I wherein $R^1$ represents hydroxy by conventional methods for the preparation of esters. (R. B. Wagner and H. D. Zook, "Synthetic Organic Chemistry," John Wiley, New York, N.Y., 1965, p. 480). In a convenient synthetic route, the 2-R-8-chlorocinchoninic acid is reacted with a reagent such as thionyl chloride or oxalyl chloride, and the excess reagent is removed to obtain the 2-R-8-chlorocinchoninic acid chloride. This acid chloride is then reacted directly with an appropriate alcohol to give the desired 2-R-8-chlorocinchoninic acid ester.

The compounds of Formula I wherein R is 2-pyridyl and $R^1$ represents hydrazino, $\beta$-monoloweralkylhydrazino, or $\beta,\beta$-diloweralkylhydrazino are prepared using established methods by reacting 8-chloro-2-(2-pyridyl)cinchoninic acid esters with an excess of hydrazine, monoloweralkylhydrazine or 1,1-diloweralkylhydrazine at reflux temperatures for several hours (R. B. Wagner and H. D. Zook, "Synthetic Organic Chemistry," John Wiley, New York, N.Y., 1965, p. 569) These compounds are also prepared by heating 8-chloro-2-(2-pyridyl)cinchoninic acid chloride with an excess of the above-mentioned hydrazines in an inert solvent.

The Formula I compounds wherein R is 2-pyridyl and $R^1$ represents -monoloweralkylidenehydrazino are prepared by heating 8-chloro-2-(2-pyridyl)cinchoninic acid hydrazide with an excess of the appropriate ketone or aldehyde. Separation and, if desired, purification by accepted procedures give the desired 8-chloro-2-(2-pyridyl)cinchoninic acid $\beta$-monoloweralkylidenehydrazide.

8-Chloro-2-(2-pyridyl)cinchoninohydroxamic acid is obtained by reacting an 8-chloro-2-(2-pyridyl)cinchoninic acid ester with hydroxylamine hydrochloride in the presence of alkali, typically at reflux temperatures (R. B. Wagner and H. D. Zook, "Synthetic Organic Chemistry," John Wiley, New York, 1965, p. 569).

The following examples illustrate the synthesis of representative compounds of the present invention.

EXAMPLE 1

Sodium 8-Chloro-2-(2-pyridyl)cinchoninate

7-Chloroisatin (225 g.) was added to a vigorously stirring solution of sodium hydroxide (225 g.) in water (1.4 l.); the resulting solution was heated at 80° to 90°C. for 30 minutes. 2-Acetylpyridine (200 g.) was added to this solution, and the resulting mixture was refluxed for 6 hours. The reaction mixture was cooled in an ice-bath; the solids were removed by filtration through a sintered-glass funnel and were washed first with ethanol and then with diethyl ether to give sodium 8-chloro-2-(2-pyridyl)cinchoninate.

EXAMPLE 2

8-Chloro-2-(2-pyridyl)cinchoninic Acid

The 8-chloro-2-(2-pyridyl)cinchoninate obtained in Example 1 was suspended in water (approximately 8 l.), adjusting the pH with glacial acetic acid to about pH 2. The crude product was removed by filtration, was washed first with ethanol and then with diethyl ether, and was crystallized from hot N,N-dimethylformamide (about 3 l.) to give 236 g. of 8-chloro-2-(2-pyridyl)cinchoninic acid, melting point 322°–324°C. (d).

Analysis calculated for $C_{15}H_9ClN_2O_2$:
Theory: C, 63.28; H, 3.19; N, 9.84; Cl, 12.45; O, 11.24
Found: C, 63.52; H, 3.38; N, 9.65; Cl, 12.64; O, 11.40.

EXAMPLE 3

Ethyl 8-Chloro-2-(2-pyridyl)cinchoninate

A mixture of 8-chloro-2-(2-pyridyl)cinchoninic acid (20 g.) and thionyl chloride (300 ml.) was refluxed for 6 hours. Excess thionyl chloride was removed under vacuum. Ethanol (500 ml.) was added to the residue, and the resulting solution was heated under reflux for 18 hours. Ethanol was removed under vacuum, and water (500 ml.) was added to the residue. The pH of the resulting suspension was adjusted with 5 N sodium hydroxide to about pH 3. The solid product was removed by filtration, washed with water and recrystallized from acetone to give 19.6 g. of ethyl 8-chloro-2-(2-pyridyl)cinchoninate, melting point 127°–130°C.

Analysis calculated for $C_{17}H_{13}ClN_2O_2$:
Theory: C, 65.28; H, 4.19; N, 8.96; O, 10.23; Cl, 11.34
Found: C, 65.06; H, 4.28; N, 9.18; O, 9.95; Cl, 11.51.

EXAMPLE 4

8-Chloro-2-(2-pyridyl)cinchoninic Acid Hydrazide

To a mixture of ethyl 8-chloro-2-(2-pyridyl)cinchoninate (5 g.) in ethanol (50 ml.) was added 97 percent hydrazine (1 g.), and the resulting mixture was heated under reflux for 6 hours. The precipitate that formed was removed by filtration and washed with ethanol to give 3.9 g. of 8-chloro-2-(2-pyridyl)cinchoninic acid hydrazide, melting point 264°–266°C.

Analysis calculated for $C_{15}H_{11}ClN_4O$:
Theory: C, 60.31; H, 3.71; N, 18.76; O, 5.36; Cl, 11.87
Found: C, 60.12; H, 3.71; N, 18.68; O, 5.63; Cl, 12.10.

EXAMPLE 5

8-Chloro-2-(2-pyridyl)cinchoninic Acid $\beta$-Isopropylidenehydrazide

A solution of 8-chloro-2-(2-pyridyl)cinchoninic acid hydrazide (2 g.) in acetone (150 ml.) was heated under reflux for 40 hours. The solvent was removed under vacuum, and the residue was crystallized from acetone to give 0.25 g. of 8-chloro-2-(2-pyridyl)cinchoninic acid $\beta$-isopropylidenehydrazide, melting point 218°–222°C.

Analysis calculated for $C_{18}H_{15}ClN_4O$:
Theory: C, 63.81; H, 4.46; N, 16.54; Cl, 10.46
Found: C, 64.04; H, 4.50; N, 16.29; Cl, 10.22.

EXAMPLE 6

Sodium 8-Chloro-2-(2-furyl)cinchoninate

7-Chloroisatin (91 g.) was added to a solution of sodium hydroxide (90 g.) in water (590 ml.), and the resulting mixture was heated at 80°–90°C. for 30 minutes. 2-Acetylfuran (55 g.) was then added slowly over a period of about 20 minutes, and the reaction mixture was heated under reflux for about 2 hours. The reaction mixture was then cooled to 0°C., and the precipitate formed was removed by filtration through a sintered-glass funnel to give sodium 8-chloro-2-(2-furyl)cinchoninate.

EXAMPLE 7

8-Chloro-2-(2-furyl)cinchoninic Acid

The sodium 8-chloro-2-(2-furyl)cinchoninate obtained in Example 6 was dissolved in water (about 2.5 l.), and the pH of the resulting solution was adjusted with glacial acetic acid to about pH 3 to pH 4. The solids formed were removed by filtration and recrystallized from acetone to give 70.1 g. of 8-chloro-2-(2-furyl)cinchoninic acid, melting point 237°–240°C.

Analysis calculated for $C_{14}H_8ClNO_5$:
Theory: C, 61.43; H, 2.94; N, 5.11; O, 17.53; Cl, 12.95
Found: C, 61.25; H, 2.95; N, 4.96; O, 17.42; Cl, 12.82.

EXAMPLE 8

8-Chloro-2-[2-(5-nitro-2-furyl)vinyl]cinchoninic Acid

To a solution of 8-chloro-2-methylcinchoninic acid (4 g.) in acetic acid (40 ml.) was added 5-nitrofurfural diacetate (5 g.); the resulting solution was heated under reflux for 5 hours. The solids that precipitated upon cooling were removed by filtration and were recrystallized from acetone to give 3.2 g. of 8-chloro-2-[2-(5-nitro-2-furyl)vinyl]cinchoninic acid, melting point 255°–258°C.(d). An analytical sample, melting point 257°–260°C. (d), was prepared by recrystallization from ethanol.

Analysis calculated for $C_{16}H_9ClN_2O_5$:
Theory: C, 55.75; H, 2.63; N, 8.13; O, 23.21; Cl, 10.28
Found: C, 55.90; H, 2.89; N, 7.97; O, 22.92; Cl, 10.71

EXAMPLE 9

8-Chloro-2-(2-thienyl)cinchoninic Acid

To a mixture of 7-chloroisatin (15 g.) in a 12% sodium hydroxide solution (350 ml.) was added 2-acetylthiophene (30 g.); the resulting mixture was refluxed for 18 hours. The reaction mixture was neutralized to about pH 7 with concentrated hydrochloric acid, and the solids formed were removed by filtration. The pH of the filtrate was then adjusted to about pH 2 with concentrated hydrochloric acid; the precipitate that formed was separated by filtration and was recrystallized from acetone to give 12.2 g. of 8-chloro-2-(2-thienyl)cinchoninic acid, melting point 270°–273°C.

Analysis calculated for $C_{14}H_8ClNO_2S$:
Theory: C, 58.03; H, 2.78; N, 4.84; O, 11.04; S, 11.07; Cl, 12.24.
Found: C, 58.23; H, 2.83; N, 3.02; O, 11.34; S, 10.96; Cl, 12.29.

EXAMPLE 10

8-Chloro-2-(5-nitro-2-thienyl)cinchoninic Acid

8-Chloro-2-(2-thienyl)cinchoninic acid (12.5 g.) was dissolved in concentrated sulfuric acid (75 ml.). A cooled mixture of concentrated nitric acid (7 ml.) and concentrated sulfuric acid (7 ml.) was added slowly so that the temperature of the reaction mixture never exceeded 8°C. The reaction mixture was stirred for an additional 1.5 hours; it was then poured slowly onto about 1.5 kg. of an ice-water mixture. The precipitated product was separated by filtration and recrystallized from acetone to give 5.8 g. of 8-chloro-2-(5-nitro-2-thienyl)cinchoninic acid, melting point >260°C.(d).

EXAMPLES 11 to 22

Other representative compounds of the present invention prepared using the methods described and exemplified hereinabove include:

8-Chloro-2-(2-pyridyl)cinchoninic acid $\beta,\beta$-dimethylhydrazide, prepared from 8-chloro-2-(2-pyridyl)-cinchoninic acid chloride and unsymmetrical dimethylhydrazine by the method of Example 4, m. p. 215°–217°C.

8-Chloro-2-(2-pyridyl)cinchoninic acid $\beta$-methylhydrazide, prepared from ethyl 8-chloro-2-(2-pyridyl)cinchoninate and methylhydrazine by the method of Example 4, m. p. 223°–224°C.

8-Chloro-2-(2-pyridyl)cinchoninohydroxamic acid, prepared by dissolving sodium (2 g.) in ethanol (150 ml.), adding hydroxylamine hydrochloride (8 g., dried under vacuum), then adding ethyl 8-chloro-2-(2-pyridyl)cinchoninic acid (4 g.), heating under reflux for 18 hours, separating and purifying by standard methods and crystallizing from ethanol, m. p. 200°C.(d).

8-Chloro-2-(3-indolyl)cinchoninic acid, prepared from 7-chloroisatin and 3-acetylindole by the method of Examples 1 and 2, m. p. 270°–273°C.

8-Chloro-2-(1-methyl-3-indolyl)cinchoninic acid, prepared from 7-chloroisatin and 3-acetyl-1-methylindole according to the method of Examples 1 and 2, m. p. 276°–279°C. (d).

Ethyl 8-chloro-2-(1-methyl-3-indolyl)cinchoninate, prepared from 8-chloro-2-(1-methyl-3-indolyl)cinchoninic acid by the method of Example 3, m. p. 184°–185°C. (d).

8-Chloro-2-(2-phenoxathiinyl)cinchoninic acid, prepared from 7-chloroisatin and 2-acetylphenoxathiin by the method of Examples 1 and 2, m. p. 276°–281°C.

8-Chloro-2-[2-(2-furyl)vinyl]cinchoninic acid, prepared from 8-chloro-2-methylcinchoninic acid and furfural diacetate by the method of Example 8.

Sodium 8-chloro-2-(2-furyl)cinchoninate, prepared from 7-chloroisatin and 2-acetylfuran by the method of Example 1.

8-Chloro-2-(1-methyl-2-indolyl)cinchoninic acid, prepared from 7-chloroisatin and 2-acetyl-1-methylindole by the method of Examples 1 and 2, m. p. 259°–261°C.(d).

8-Chloro-2-(2-indolyl)cinchoninic acid, prepared from 7-chloroisatin and 2-acetylindole by the method of Examples 1 and 2.

Calcium 8-chloro-2-(2-pyridyl)cinchoninate, prepared from 8-chloro-2-(2-pyridyl)cinchoninic acid by standard procedures.

Detailed Description of the Invention—Utility

It has been discovered that the compounds of the present inventions are useful as antibacterial agents. In a preferred embodiment of this invention the compounds are useful in vivo in the treatment of infections of streptococcal origin. Although the dose should, in every case, be individualized in view of factors such as species, age, weight, and severity of infection involved, the compounds typically are administered parenterally and are effective in the control of Streptococcus when administered in dosages from 5 to 100 mg./kg. of body weight of warm-blooded animal; doses can be divided for convenient administration. The compounds can be given alone or together with a suitable carrier or carriers. The active agents can be administered, for example, in the form of tablets, capsules, or injections, employing conventional adjuvants.

EXAMPLES 23 – 26

The following examples illustrate the antibacterial activity of representative compounds of Formula I when tested by standard in vitro bacteriological procedures.

8-Chloro-2-(2-phenoxathiinyl)cinchoninic acid was found to have bacteriostatic activity against *Staphylococcus aureus* and *Streptococcus faecalis* at a concentration of 10 mcg./ml.

8-Chloro-2-(1-methyl-2-indolyl)cinchoninic acid was found to have bacteriostatic activity against *Staphylococcus aureus* at a concentration of 100 mcg./ml.

8-Chloro-2-(1-methyl-3-indolyl)cinchoninic acid was found to have bacteriostatic activity against *Staphylococcus aureus* at a concentration of 100 mcg./ml.

8-Chloro-2-(5-nitro-2-thienyl)cinchoninic acid was found to have bacteriostatic activity against *Pasteurella multocida* at a concentration of 0.79 mcg./ml., against *Staphylococcus aureus* at 12.5 mcg./ml., and against *Erwinia amylovora* at 25 mcg./ml.

EXAMPLES 27 to 37

The following examples illustrate the usefulness of compounds of the present invention for the in vivo control of bacterial organisms.

The in vivo efficacy of representative compounds was studied in a standard testing procedure. In this procedure, groups of eight white mice (McAllister strain, 11–13 g.) are infected by intraperitoneal injection of bacterial suspensions of *Streptococcus pyogenes* diluted in beef infusion broth with an enzymatic protein digest (Bacto Beef infusion broth with Neopeptone, Difco). Five groups of infected mice are treated by subcutaneous injection with two-fold dilutions of the test compound at one hour and at five hours postinfection. In addition, for control purposes, eight infected mice are left untreated. Deaths and survivors are recorded daily for seven days. The therapeutic dose effective in curing 50 percent of the infected mice ($ED_{50}$) is calculated by the method of Reed and Muench (Reference: L. J. Reed and H. Muench, "A Simple Method for Estimating 50 percent Endpoints," Amer. J. Hyg. 27:493–497 (1938)).

In tests using this procedure, the therapeutic doses of compounds of the present invention effective in curing 50 percent of the infected mice ($ED_{50}$'s) were observed to be as follows:

| | $ED_{50}$ (mg./kg. × 2)* |
|---|---|
| 8-Chloro-2-(2-pyridyl)cinchoninic acid | 24.0 |
| 8-Chloro-2-(2-pyridyl)cinchoninic acid hydrazide | 20.8 |
| Ethyl 8-chloro-2-(2-pyridyl)cinchoninate | 24.8 |
| 8-chloro-2-(5-nitro-2-thienyl)cinchoninic acid | 31.0 |
| 8-chloro-2-[2-(5-nitro-2-furyl)vinyl]cinchoninic acid | 43.0 |
| 8-chloro-2-(3-indolyl)cinchoninic acid | 80.0 |
| 8-chloro-2-(1-methyl-3-indolyl)cinchoninic acid | 13.2 |
| 8-chloro-2-(2-pyridyl)cinchoninic acid β-methylhydrazide | 26.4 |
| 8-chloro-2-(2-pyridyl)cinchoninic acid β,β-dimethylhydrazide | 32.0 |
| 8-chloro-2-(2-pyridyl)cinchoninic acid β-isopropylidenehydrazide | 44.4 |
| 8-Chloro-2-(2-pyridyl)cinchoninohydroxamic acid | 47.6 |

*Therapy at 1 and 5 hours postinfection

8-Chloro-2-methylcinchoninic acid was prepared from 7-chloroisatin and acetone by the method of Examples 1 and 2. The product was crystallized from acetone, melting point 204°–206°C.

I claim:

1. The compounds of the formula:

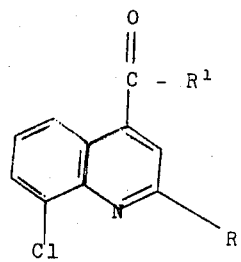

[I]

wherein R represents:
a. 2-indolyl,
b. 1-methyl-2-indolyl,
c. 3-indolyl,
d. 1-methyl-3-indolyl,
e. 2-phenoxathiinyl,
f. 2-furyl,
g. (2-furyl)vinyl,
h. (5-nitro-2-furyl)vinyl,
i. 2-thienyl, or
j. 5-nitro-2-thienyl; and
$R^1$ represents:
a. OH, or
b. loweralkoxy of 1 to 3 carbon atoms,
and the pharmaceutically-acceptable, alkali-metal and alkaline-earth-metal salts derived from those compounds of Formula I wherein $R^1$ is OH.

2. The compound of claim 1 which is 8-chloro-2-(1-methyl-3-indolyl)cinchoninic acid.

3. The compound of claim 1 which is 8-chloro-2-(5-nitro-2-thienyl)cinchoninic acid.

4. The compound of claim 1 which is 8-chloro-2-[(5-nitro-2-furyl)vinyl]cinchoninic acid.

* * * * *